United States Patent
Chen

(10) Patent No.: US 9,715,128 B2
(45) Date of Patent: Jul. 25, 2017

(54) CONNECTING STRUCTURE FOR SPECTACLE TEMPLES

(71) Applicant: Hwa Mao Optical (Xiamen) Co., Ltd., Xiamen (CN)

(72) Inventor: Tsung-Wen Chen, Taipei (TW)

(73) Assignee: HWA MAO OPTICAL (XIAMEN) CO., LTD., Xiamen, Fujian (CN)

( * ) Notice: Subject to any disclaimer, the term of this patent is extended or adjusted under 35 U.S.C. 154(b) by 0 days.

(21) Appl. No.: 15/025,285

(22) PCT Filed: Sep. 29, 2013

(86) PCT No.: PCT/CN2013/084599
§ 371 (c)(1),
(2) Date: Mar. 28, 2016

(87) PCT Pub. No.: WO2015/042910
PCT Pub. Date: Apr. 2, 2015

(65) Prior Publication Data
US 2016/0223833 A1    Aug. 4, 2016

(51) Int. Cl.
*G02C 5/14*       (2006.01)
*G02C 5/22*       (2006.01)
(52) U.S. Cl.
CPC ....... *G02C 5/2209* (2013.01); *G02C 2200/08* (2013.01)
(58) Field of Classification Search
CPC .................................... G02C 5/16; G02C 5/22
USPC .......................... 351/153, 116, 111; 16/228
See application file for complete search history.

(56) References Cited

U.S. PATENT DOCUMENTS

| | | | | |
|---|---|---|---|---|
| 3,744,887 | A * | 7/1973 | Dunbar | G02C 5/2209 16/225 |
| 5,847,801 | A * | 12/1998 | Masunaga | G02C 5/008 16/228 |
| 5,898,471 | A * | 4/1999 | Simioni | G02C 5/2209 16/228 |
| 7,422,322 | B2 * | 9/2008 | He | G02C 5/10 16/228 |
| 8,944,591 | B2 * | 2/2015 | Li | G02C 3/003 16/228 |

* cited by examiner

*Primary Examiner* — Hung Dang
(74) *Attorney, Agent, or Firm* — Leong C. Lei

(57) ABSTRACT

Disclosed is a connecting structure for spectacle temples. An axle slot and axle hole are formed coaxially on a spectacle frame and a preemptive groove transversely on the spectacle frame, with the preemptive groove being linked up with the axle slot at a position thereof close to the axle hole; a pivot and connecting section are formed on a spectacle temple, the connecting section is in connection with the middle of the pivot, an elastic cutting slot is respectively formed on the two ends of the pivot, the two ends of the pivot are inserted in the axle hole and axle slot, and the connecting section is aligned with the preemptive groove, allowing the spectacle temple to be coupled pivotally to the spectacle frame. Whereby, the connection is secure, and the operation feel of closing and opening the spectacle is better.

3 Claims, 3 Drawing Sheets

CONNECTING STRUCTURE FOR SPECTACLE TEMPLES

TECHNICAL FIELD OF THE INVENTION

The present invention relates to a pair of spectacles, and more particularly to a connecting structure for spectacle temples.

DESCRIPTION OF THE PRIOR ART

In conventional spectacles, a spectacle temple is coupled to a spectacle frame generally by means of pivoting, and there are two kinds of pivoting manners.

One is: forming a pivot seat on a spectacle temple and spectacle frame; forming a screw hole and through hole on the pivot seat; passing a screw through the through hole and turning it into the screw hole, allowing the spectacle temple to be coupled pivotally to the spectacle frame. Such kind of pivoting uses a screw (metal element) and needs a tool to carry out the assembly and detachment so that the operation is inconvenient, the safety of the screw connection is bad and it is not environmentally friendly.

Another is: forming an axle hole and preemptive groove on a spectacle frame; forming a pivot and connecting section on a spectacle temple; inserting the pivot into the axle hole, aligning the connecting section with the preemptive groove, thereby allowing the spectacle temple to be coupled pivotally to the spectacle frame. Such kind of pivoting way is more convenient in operation because the direct insertion assembly or direct removal detachment is adopted, safer in wearing glasses because no metal element such as screw is used and it is environmentally friendly such that the glasses is particularly suitable for children to wear, but the spectacle temple so made is easy to separate from the spectacle frame automatically or even easy to fall off because the pivot is in looser fit with the axle hole. Therefore, the connection of the spectacle temple with the spectacle frame is not secure and the operation feel of opening and closing the spectacle temple is worse.

SUMMARY OF THE INVENTION

To overcome the defects mentioned above, the object of the present invention is to provide a connection structure for spectacle temples, allowing the assembly, detachment and replacement of spectacle temples to be very convenient.

To achieve the object mentioned above, the present invention proposes a connecting structure for spectacle temples, wherein an axle slot and axle hole are formed coaxially on a spectacle frame and a preemptive groove transversely on the spectacle frame, with the preemptive groove being linked up with the axle slot at a position thereof close to the axle hole; a pivot and connecting section are formed on a spectacle temple, the connecting section is in connection with the middle of the pivot, an elastic cutting slot is respectively formed on the two ends of the pivot, the two ends of the pivot are inserted in the axle hole and axle slot, and the connecting section is aligned with the preemptive groove, allowing the spectacle temple to be coupled pivotally to the spectacle frame.

A projection and lead angle are respectively formed on the surfaces of the two ends of the pivot.

The opening of the axle slot is a C-shaped opening close to the corner of the spectacle frame.

Spectacles of the present invention can be produced without metal elements such as screws such that high safety and environmental protection can be obtained, suitable for the use of children. The spectacle temple can be inserted in or removed from the spectacle frame directly to carry out the assembly or detachment without needing a tool, allowing the assembly, detachment and replacement of the spectacle temple to be more convenient. Furthermore, the folding operation of the spectacle temples is very convenient and easy. In addition, the pivot is in tight fit with the axle slot and axle hole through the elastic cutting slots, allowing the connection to be more secure, and the opening and folding of the spectacle temple benefit from the resistance generated from the tight fit, allowing the operation feel to be better.

The aforementioned and other objectives and advantages of the present invention will become clearer in light of the following detailed description of an illustrative embodiment of this invention described in connection with the drawings. It is intended that the embodiments and drawings disclosed herein are to be considered illustrative rather than restrictive.

DETAILED DESCRIPTION OF THE PREFERRED EMBODIMENTS

Figure 1:
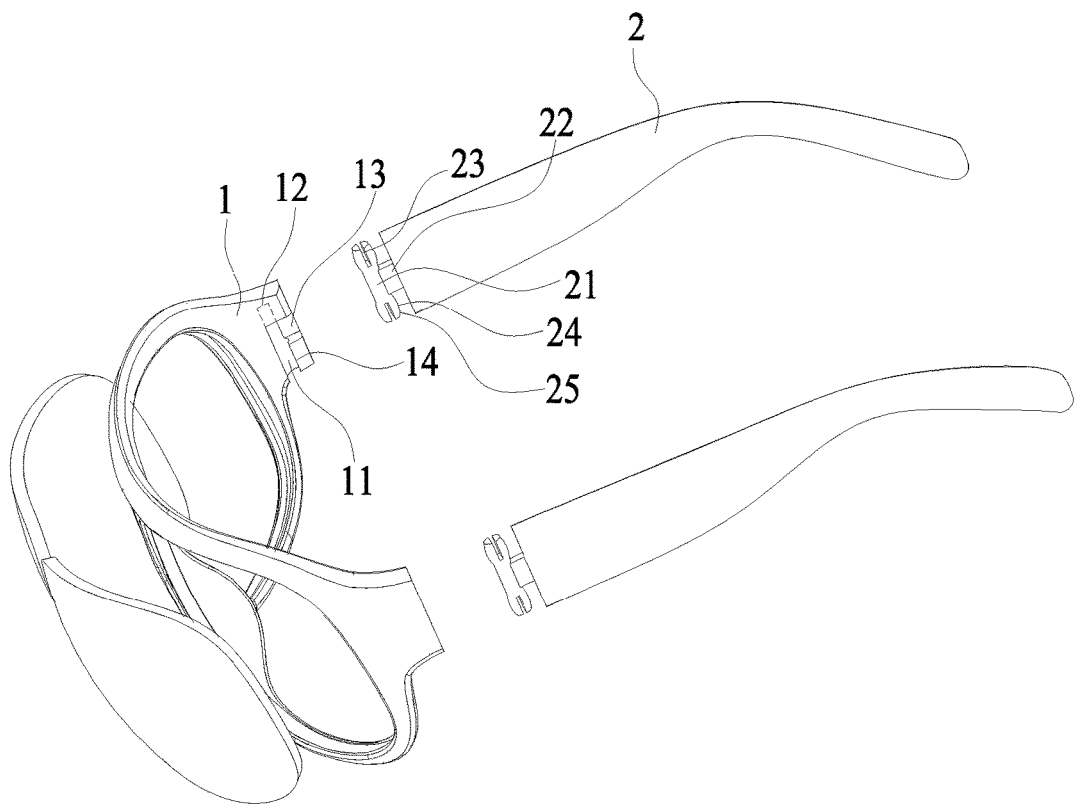
FIG. 1 is an exploded view of the present invention.
Figure 2:
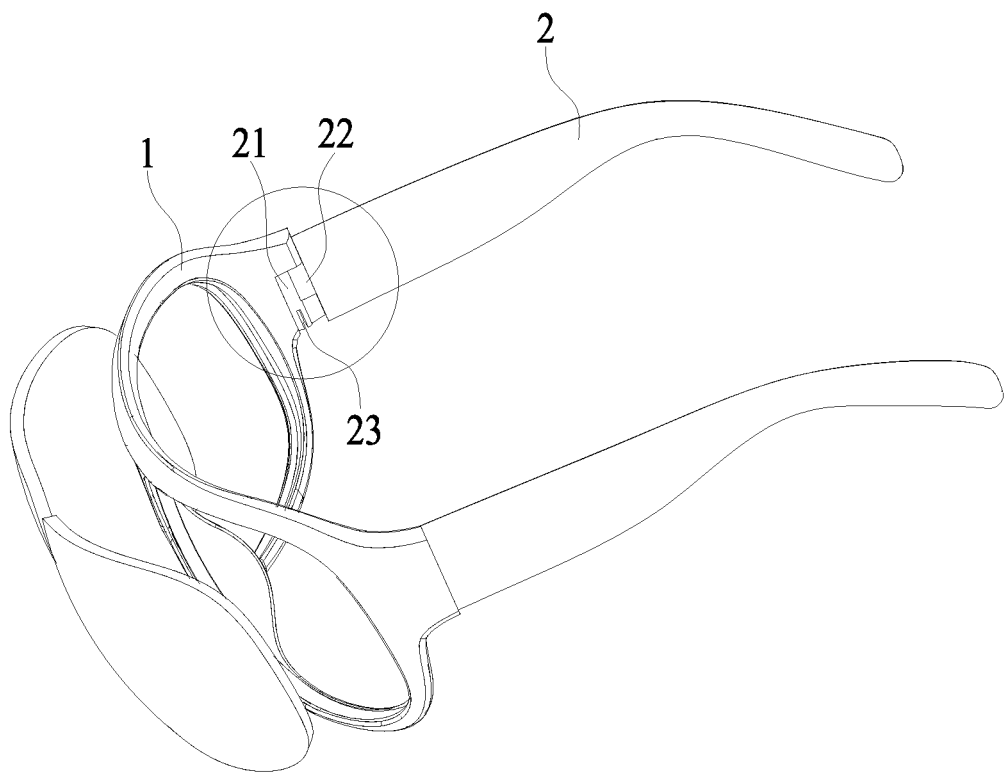
FIG. 2 is a schematically perspective view of the present invention after assembly.
Figure 3:
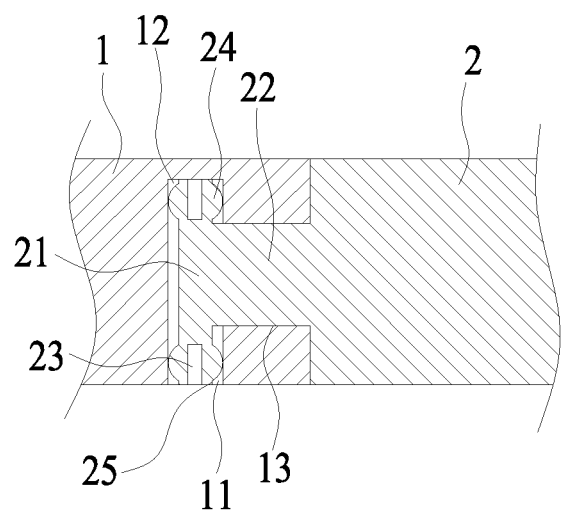
FIG. 3 is a partly enlarged cross-sectional view of the present invention.

Referring to FIGS. 1 to 3, showing a connecting structure for spectacle temples according to the present invention, an axle slot 11 and axle hole 12 are formed coaxially longitudinally on a spectacle frame 1, and a preemptive groove 13 is formed transversely on the spectacle frame 1, where the axle slot 11 is linked up with the preemptive groove 13 at the position thereof close to the axle hole 12. Furthermore, a pivot 21 and connecting section 22 are configured on a spectacle temple 2, where the connecting section 22 is in connection with the middle of the pivot 21, and the two ends of the pivot 21 are respectively formed with an elastic cutting slot 23.

In order to fit the pivot 21 with the axle slot 11 and axle hole 12 more securely, in the embodiment, a projection 24 is respectively formed on the surfaces of the two ends of the pivot 21, and in order to allow the insertion of the pivot 21 in the axle slot 11 and axle hole 12 upon assembly and the removal of the pivot 21 therefrom upon detachment more labor-saving, in the embodiment, a lead angle 25 is respectively formed on the surfaces of the two ends of the pivot 21.

In order to preventing the pivot 21 from escaping casually axially from the axle hole 12 and axle slot 11, in the embodiment, an opening 14 of the axle slot 11 is further designed to be a C-shaped opening, and the C-shaped opening 14 is close to a corner of the spectacle frame 1, allowing the connecting section 22 and opening 14 to be not aligned with each other when the spectacle temple 2 is at a natural folding angle. The pivot 21 cannot escape from the axle slot 11 and axle hole 12 axially because it is generally difficult to fold the spectacle temple 2 to close it to the spectacle frame 1 completely without applying an external force, ensuring that the connection of the spectacle temple 2 with the spectacle frame 1 is secure.

When the spectacle temple 2 of the present invention is to be assembled, first, the pivot 21 is aligned with the axle slot 11 and the connecting section 22 the opening 14 of the axle slot 11, and the pivot 21 is then inserted in the axle slot 11 from bottom to top until the connecting section 22 is aligned with the preemptive groove 13. At this time, the pivot 21 can be inserted in the axle slot 11 and axle hole 13 in a rotatable way and tuned with a degree of relaxation through the elastic cutting slots 23. It is specifically identified that the spectacle temple 2 is in secure pivoting connection with the spectacle frame 1, allowing the assembly to be very convenient.

When the spectacle temple 2 of the present invention is to be detached from the spectacle frame 1, the connecting section 22 is aligned with the opening 14, and the pivot 21 can then be removed quickly from the axle slot 11 and axle hole 12 from top to bottom; it is clear that the detaching operation is very convenient.

In the present invention, because the tight fit generated by the elastic cutting slots 23 allows the rotating resistance to be increased upon the opening and closing of the spectacle temple 2 so that the operation feel is better.

It will be understood that each of the elements described above, or two or more together may also find a useful application in other types of methods differing from the type described above. While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A connecting structure for spectacle temples, wherein an axle slot and axle hole are formed coaxially on a spectacle frame and a preemptive groove is formed transversely on said spectacle frame, with said preemptive groove being linked up with said axle slot at a position thereof close to said axle hole; a pivot and a connecting section are formed on a spectacle temple, said connecting section is in connection with a middle of said pivot, an elastic cutting slot is respectively formed on two ends of said pivot, said two ends of said pivot are inserted in said axle hole and axle slot, and said connecting section is aligned with said preemptive groove, allowing said spectacle temple to be coupled pivotally to said spectacle frame;

wherein said axle slot comprises an opening that is formed in said spectacle frame such that said opening is aligned with said connecting section of the spectacle temple to allow said spectacle temple to be coupled pivotally to said spectacle frame.

2. The structure according to claim 1, wherein a projection and lead angle are respectively formed on surfaces of said two ends of said pivot.

3. The structure according to claim 1, wherein the opening of said axle slot is a C-shaped opening close to a corner of said spectacle frame.

* * * * *